(12) United States Patent
Anderson

(10) Patent No.: US 9,937,944 B2
(45) Date of Patent: Apr. 10, 2018

(54) DOLLY FOR MOVING OBJECTS

(71) Applicant: Thomas Anderson, Overpeck, OH (US)

(72) Inventor: Thomas Anderson, Overpeck, OH (US)

(*) Notice: Subject to any disclaimer, the term of this patent is extended or adjusted under 35 U.S.C. 154(b) by 274 days.

(21) Appl. No.: 14/801,255

(22) Filed: Jul. 16, 2015

(65) Prior Publication Data
US 2015/0367874 A1 Dec. 24, 2015

Related U.S. Application Data

(62) Division of application No. 13/068,517, filed on May 13, 2011, now Pat. No. 9,120,495.

(60) Provisional application No. 61/376,105, filed on Aug. 23, 2010.

(51) Int. Cl.
B62B 5/00 (2006.01)
B62B 3/04 (2006.01)
B62B 3/06 (2006.01)

(52) U.S. Cl.
CPC .............. B62B 5/0086 (2013.01); B62B 3/04 (2013.01); B62B 5/00 (2013.01); B62B 3/0606 (2013.01); B62B 5/0089 (2013.01)

(58) Field of Classification Search
CPC .............................. B62B 5/0086; B65D 90/18
USPC .................................................. 414/458, 490
See application file for complete search history.

(56) References Cited

U.S. PATENT DOCUMENTS

| 2,359,016 | A | 9/1944 | Wood |
|---|---|---|---|
| 2,375,720 | A | 5/1945 | Wood |
| 2,450,690 | A | 10/1948 | Robins |
| 2,521,819 | A | 9/1950 | Baer |
| 3,156,484 | A | 11/1964 | Talbert |
| 3,486,650 | A | 12/1969 | Boone |
| 3,570,694 | A | 3/1971 | Tantlinger |
| 4,362,458 | A | 12/1982 | Jantzi |
| 4,936,733 | A | 6/1990 | Girerd |
| 5,660,518 | A | 8/1997 | Meier |
| 5,791,856 | A | 8/1998 | Kosonen et al. |
| 6,634,658 | B2 | 10/2003 | Larouche |

(Continued)

OTHER PUBLICATIONS

USPTO Office Action for U.S. Appl. No. 13/068,517, dated Dec. 19, 2014.

(Continued)

Primary Examiner — Jonathan Snelting
(74) Attorney, Agent, or Firm — Mark F. Smith; Smith Brandenburg Ltd

(57) ABSTRACT

A dolly capable of allowing relatively heavy and bulky objects to be easily manipulated and moved without adding significantly to the dimension of the object thereby allowing the object to be easily moved through conventional door openings. Preferably, the dolly comprises a first frame having generally vertical legs mechanically coupled to a generally horizontal brace and a second frame having generally vertical legs mechanically coupled to a generally horizontal brace such that the first frame and the second frame are in position on opposite sides of the object and the generally horizontal braces are positioned under corresponding edges of the object. The generally vertical legs of the first frame and the second frame when moved into a more vertical orientation operate to mechanically lift the generally horizontal braces to lift the object and allow the object to be transported to a desired location.

9 Claims, 4 Drawing Sheets

(56) References Cited

U.S. PATENT DOCUMENTS

2003/0091417 A1     5/2003    Swann
2006/0245873 A1    11/2006    Black

OTHER PUBLICATIONS

USPTO Office Action for U.S. Appl. No. 13/068,517, dated Oct. 21, 2014.
USPTO Office Action for U.S. Appl. No. 13/068,517, dated Sep. 9, 2013.
USPTO Office Action for U.S. Appl. No. 13/068,517, dated Apr. 4, 2013.

DOLLY FOR MOVING OBJECTS

RELATED PATENT APPLICATIONS

This application is a divisional of U.S. patent application Ser. No. 13/068,517, filed May 13, 2011, which claims benefit to U.S. provisional patent application Ser. No. 61/376,105, filed Aug. 23, 2010, entitled CLEVER LEVER and has the same inventor in common and incorporates both applications in their entirety.

BACKGROUND OF THE INVENTION

This invention relates to a dolly and more specifically, to a new and novel dolly for lifting and transporting a relatively heavy and bulky object such as, but not limited to, machinery, furniture, containers, and other such objects.

Dollies, hand trucks, carts and the like have been developed for lifting, supporting and moving objects such as vending machines, refrigeration units, freezers, and the like, are often moved for placement in specific locations either permanently or for shorter periods of time such as fairs, festivals, and other such events where a large number of units are brought in individually with a great deal of effort.

Transportation of such objects is typically done by manual labor often with the use of a hand dolly. Unfortunately, one problem with many conventional dollies is that they typically not mechanical stable in construction. Another problem is that many objects can easily become detached from the dolly inadvertently while the object is being moved. Further, often these dollies are difficult to maneuver by a single person. In addition, dollies that can be used by an individual for lifting and transporting relatively large and bulky objects are relatively expensive to manufacture, often difficult to attach and to maneuver, or significantly increase the width or height needed to move through a door opening.

Accordingly, a need exist for a dolly that is capable of allowing relatively heavy and bulky objects to easily manipulated and moved. In addition, a need exists for a dolly capable of attaching to an object without adding significantly to the dimension of the object thereby allowing the object to be easily moved through conventional door openings. Further, it is desirable that the dolly be relatively inexpensive to manufacture, easily attached and detached to an object, and relatively easy to maneuver the object being transported.

SUMMARY OF THE INVENTION

The subject invention is a new and novel dolly for lifting and transporting a relatively heavy and bulky object such as machinery, furniture, container, or other such object. In a preferred embodiment of the invention the dolly for lifting and transporting objects comprises a first frame for placing on one side of an object and a second frame for placing on a second opposing side of an object. The first frame comprises at least one generally vertical member having a generally horizontal brace and at least one generally vertical leg pivotally coupled to the vertical member and the second frame comprises at least one generally vertical member having a generally horizontal brace and at least one generally vertical leg pivotally coupled to the vertical member. Each vertical member includes at least one roller coupled to the lower longitudinal end of each vertical member. The first frame and the second frame each have a loading configuration such that the horizontal brace is at its lower position for placement under an object, and the first frame and the second frame each have a lifting configuration whereby each generally vertical leg is oriented generally parallel with their respective vertical member and whereby the horizontal brace is in its upper position.

In another preferred embodiment, the dolly comprises a first and a second frame each frame having a first pair of spaced apart generally vertical members attached together by an upper generally horizontal end rail and a lower generally horizontal cross member forming a generally rectangular shaped first subframe. A pair of spaced apart generally vertical members extend downwardly and are pivotally attached to the longitudinal ends of the upper generally horizontal end rail forming an angle between the spaced apart generally vertical legs and the pair of spaced apart generally vertical members. The spaced apart generally vertical members are connected together at their lower ends by a generally horizontal brace forming a generally rectangular shaped second subframe and effective for placing under the edge of the object to be lifted and transported. Mounted to the underside of the first and second outboard ends of the horizontal cross member are rollers for rolling across the surface of a floor. The first frame further comprises one or more winches securely mounted on the outer face of the lower generally horizontal cross member of the first frame and each include a pulley and gear assembly having a belt for coupling with the distal ends of the generally horizontal cross member of the second frame. Upon activation of the winches, the rollers are moved inwardly to cause the second subframe to rotate inwardly such that the pair of spaced apart generally vertical legs move into position parallel to the spaced apart generally vertical members thereby pushing the horizontal brace upwardly to raise and lift the object off the ground.

In another preferred embodiment of the invention, the base plate is vertically adjustable for positioning under an object to be lifted and transported.

In another preferred embodiment of the invention, the dolly is formed substantially of wood.

In another preferred embodiment of the invention, the first frame and the second frame include a limiting device to limit the distance that the generally vertical legs can pivot rearwardly from the spaced apart generally vertical members.

In another preferred embodiment of the invention the dolly has one or more handles for attaching to the first and second frames.

In another preferred embodiment of the invention the first and second frames each have a handle attachment for removably attaching a handle.

In another preferred embodiment of the invention the outboard ends of the horizontal cross members each include rearwardly extending extension blocks for mounting rollers thereto.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The subject invention is a new and novel dolly for lifting and transporting relatively heavy and bulky objects such as machinery, furniture, containers, or other such objects. Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims. Therefore, specific structural and functional details disclosed herein are not to be interpreted as limiting, but merely as a basis for the claims and as a representative basis for teaching one skilled in the art to variously employ the present invention in virtually any appropriately detailed structure.

As used herein the terms "upward" or "upwardly" refers to the direction away from the ground or floor; the terms "downward" or "downwardly" refers to the direction towards the ground or floor; the term "lower" refers to a position closest to the ground or floor; the term "upper" refers to a position furthest from the ground or floor; the terms "vertical" or "vertically" refers to a plane generally perpendicular or normal to the ground or floor; and the term "horizontal" or "horizontally" refers to a plane generally parallel to the ground or floor. As used herein the terms "forwardly" or "forward" refers to the direction towards the object being transported and the terms "rearwardly" or "reward" refers to the direction away from the object being transported.

Figure 1:
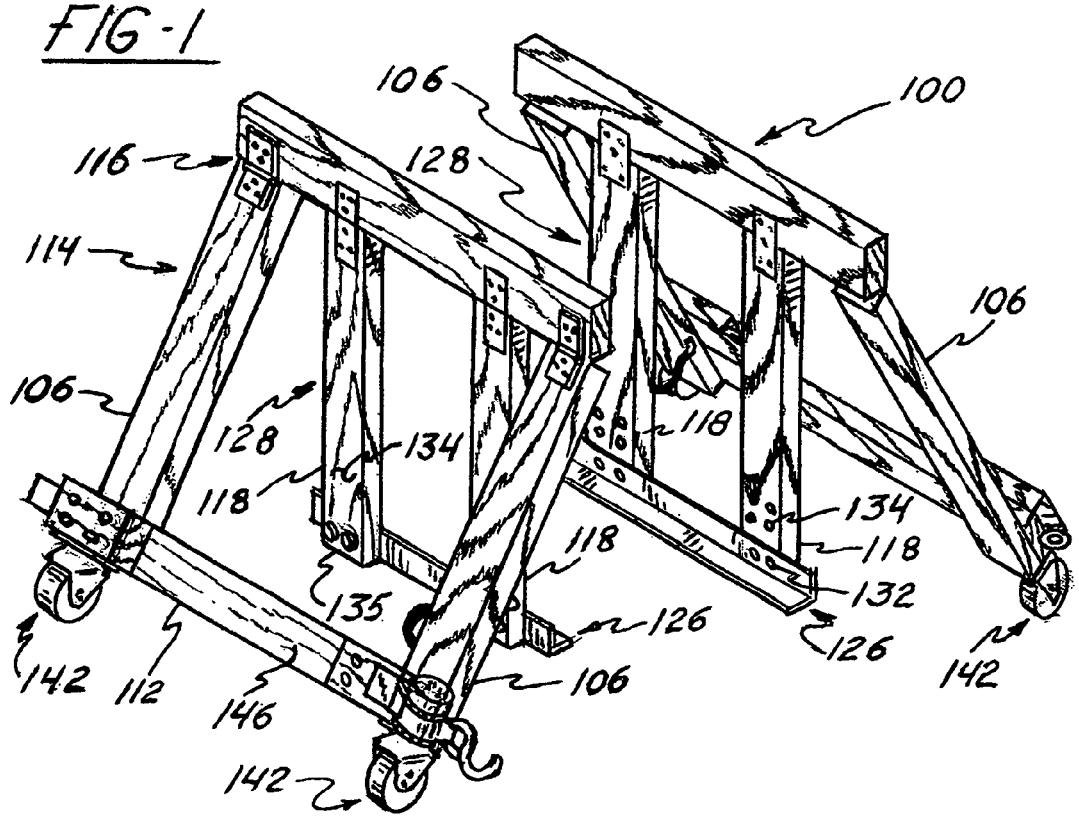
FIG. 1 is a perspective view of the dolly of the subject application showing first and second frames each having a generally horizontal brace for placing under the object to be lifted and transported.
Figure 2:
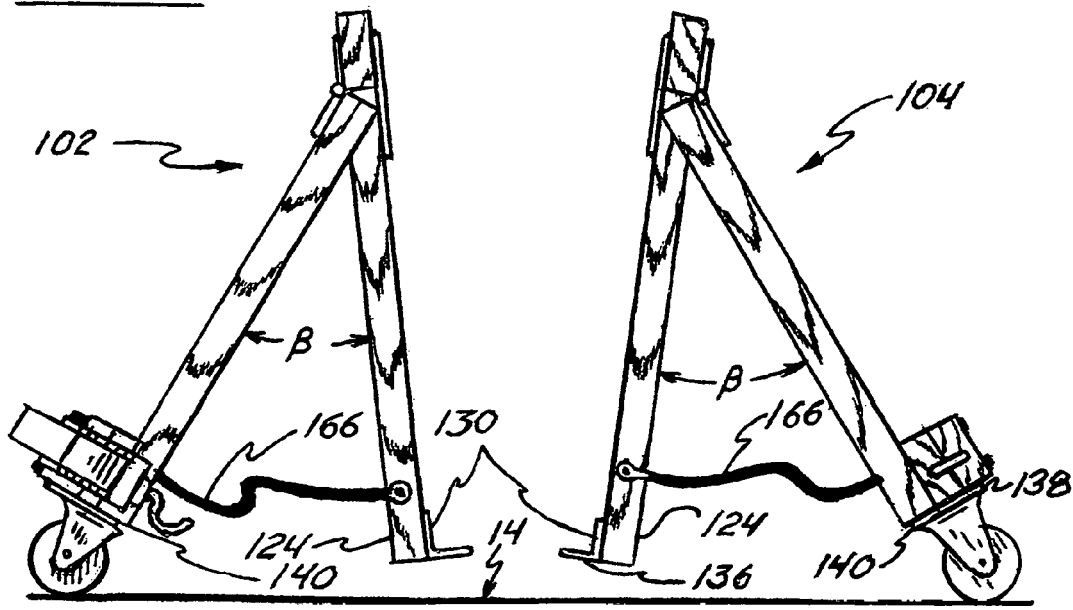
FIG. 2 is a side elevation view of the dolly of FIG. 1 showing first and second frames each frame having the second pair of spaced apart generally vertical legs in their angular orientation with respect to the first pair of spaced apart generally vertical members.
Figure 3:
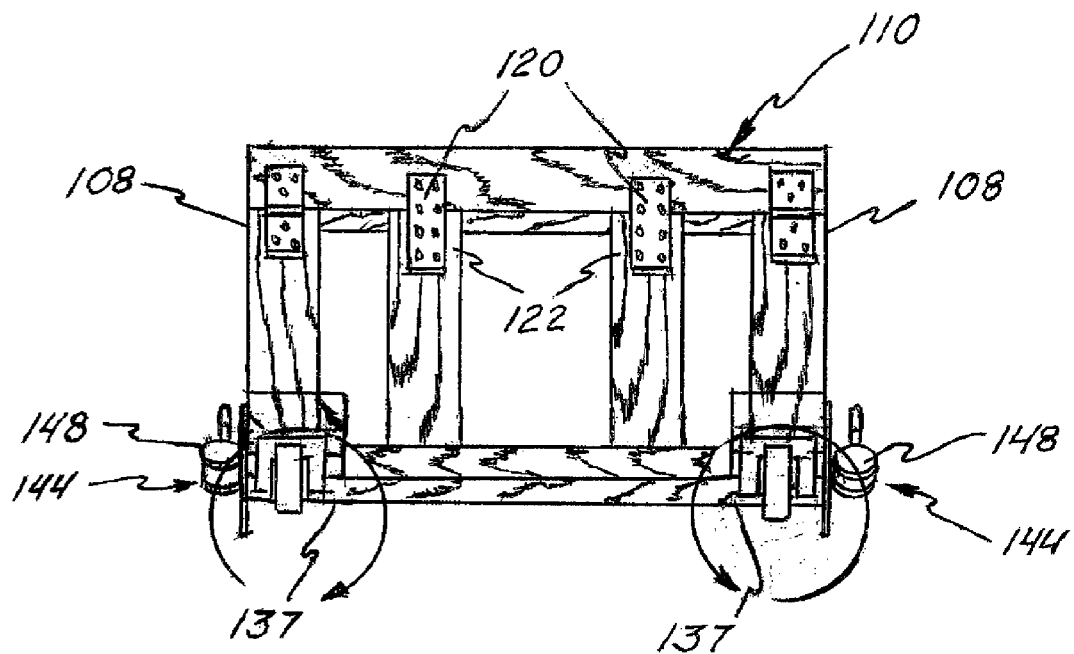
FIG. 3 is a front view of one frame of the dolly of FIG. 1.

Referring to FIGS. 1, 2 and 3, a preferred embodiment of the dolly of the subject invention 100 is shown comprising first and second frames 102, 104, respectively. Each frame 102 and 104 includes a pair of spaced apart generally vertical legs 106 attached to their outer longitudinal ends 108 of an upper generally horizontal end rail 110 and a lower generally horizontal cross member 112 forming a generally rectangular shaped first subframe 114. The generally vertical legs 106 are each pivotally coupled to their respective horizontal end rail 110 by pivotal attachment means 116 such as by a pivotal hinges each having one end attached to the respective vertical leg 106 and the other end attached to the horizontal cross member 112 by screws, bolts, nails, or other suitable means.

Figure 4:
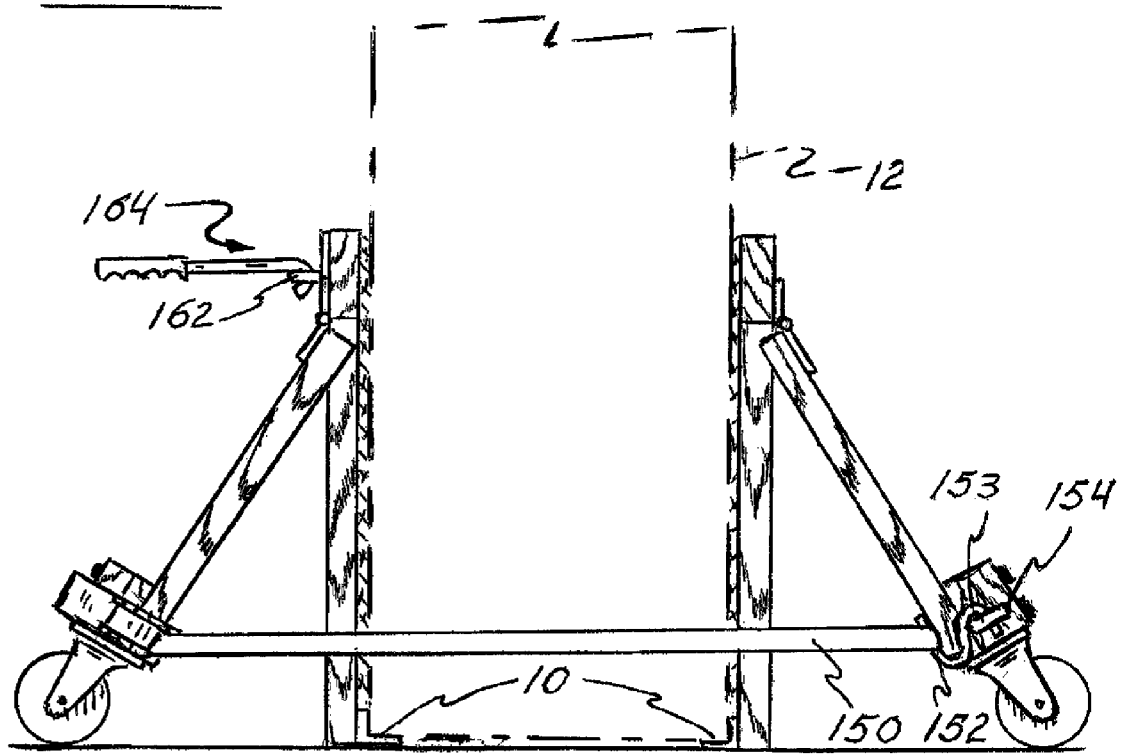
FIG. 4 is a side elevation view of the dolly of FIG. 1 showing the dolly in its loading configuration for lifting an object and the rollers in position for moving inwardly by operation of at least one winch.

A pair of spaced apart generally vertical members 118 extend downwardly from and are attached, such as by brackets 120, to their respective inner longitudinal ends 122 of the first upper generally horizontal end rail 110 forming an angle 13 between the spaced apart generally vertical legs 106 and the spaced apart generally vertical members 118. As shown, the spaced apart generally vertical members 118 are coupled at their lower longitudinal ends 124 to a generally horizontal brace 126 forming a generally rectangular shaped second subframe 128. The generally horizontal brace 126 preferably has an L-shaped cross section with a vertically extending plate section 130 and includes holes 132 which align with holes 134 positioned along the lower longitudinal ends 124 of generally vertical members 118 for receiving bolts, screws, or other suitable, and preferable removable, attachment means 135. As shown in FIG. 1, in a preferred embodiment of the invention, more than one set of holes 134 may be vertically arranged along the generally vertical members 118 to allow the generally horizontal brace 126 to be attached at different vertical positions along the members 118. The generally L-shaped horizontal brace 126 further includes a horizontally extending plate section 136 oriented to be effective for placement under the outer edge 10 of an object 12 to be lifted and transported, as shown in FIG. 4.

Figure 7:
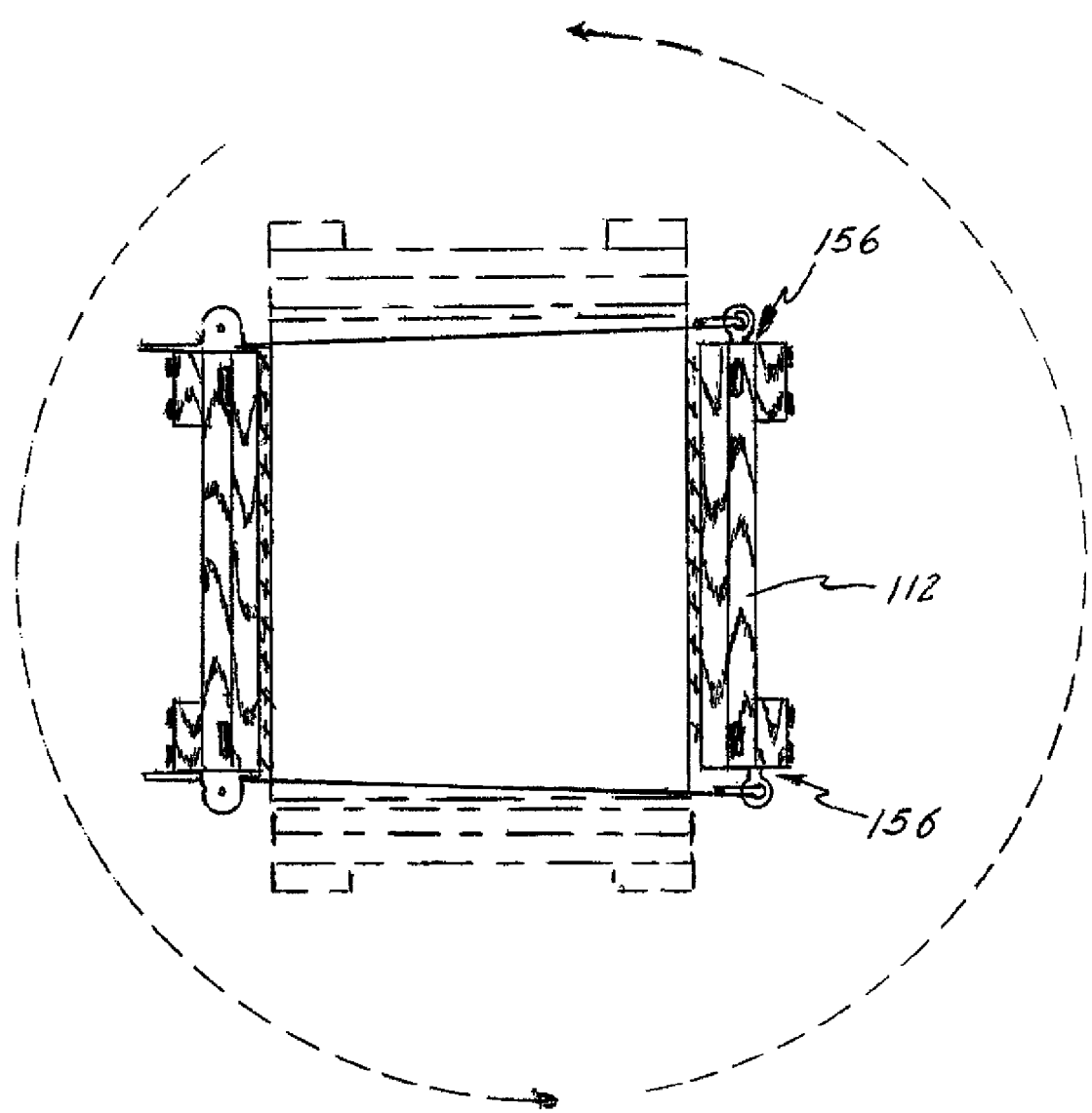
FIG. 7 is a top plan view of the dolly of FIG. 6 showing the dolly in its full lifting configuration for transporting the object.

Coupled, such as by brackets 138 to the underside downwardly facing surface 140 of the longitudinal outboard ends 137 of each horizontal cross member 112, are rollers 142 for rolling across the ground or surface of a floor 14. It should be understood that rollers as used herein refers to various types of rollers, casters (plate and stem), and wheels and preferably are capable of swiveling in a 360 degree rotation to allow the dolly to easily maneuver across the floor. The first frame 102 of dolly 100 further comprises a pulling apparatus 144 for moving the rollers 142 inwardly. Preferably, the pulling apparatus 144 comprises a pair of conventional winch assemblies 144 securely mounted on the outer face 146 of the horizontal cross member 112. Each winch assembly 145 includes a conventional pulley and gear system 148 and a cargo strap or belt 150. The end portion 152 of each belt or strap 150 includes an attachment device 153 secured thereto and adapted for connecting to an attachment element 154 mounted to the respective distal ends 156 (FIG. 7) of the generally horizontal oriented cross member 112. It should be understood that the winch assemblies are preferably manually operated winches, however, battery operated or other types of electric winches could be utilized if desired for the particular use or operation of the dolly. Further, it should be understood that other types of pulling apparatus may be utilized for moving the rollers inwardly.

Figure 5:
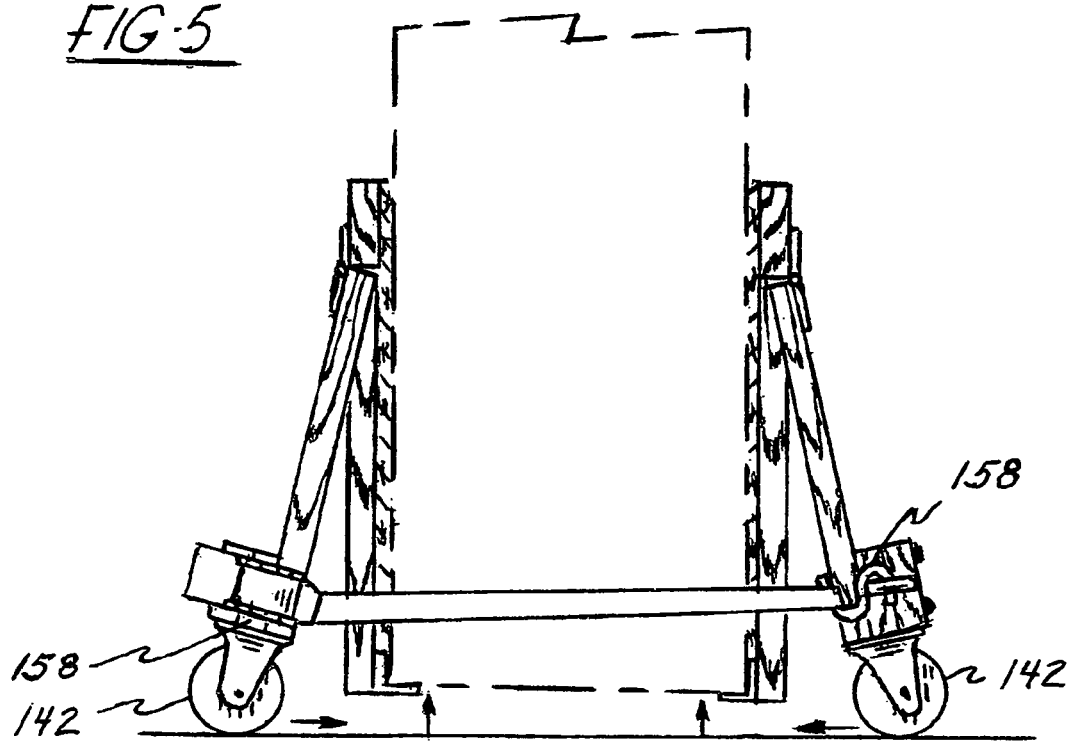
FIG. 5 is a side elevation view of the dolly of FIG. 4 showing the dolly in its lifting configuration for lifting an object and the rollers being moved inwardly by operation of the winch to lift the object.
Figure 6:
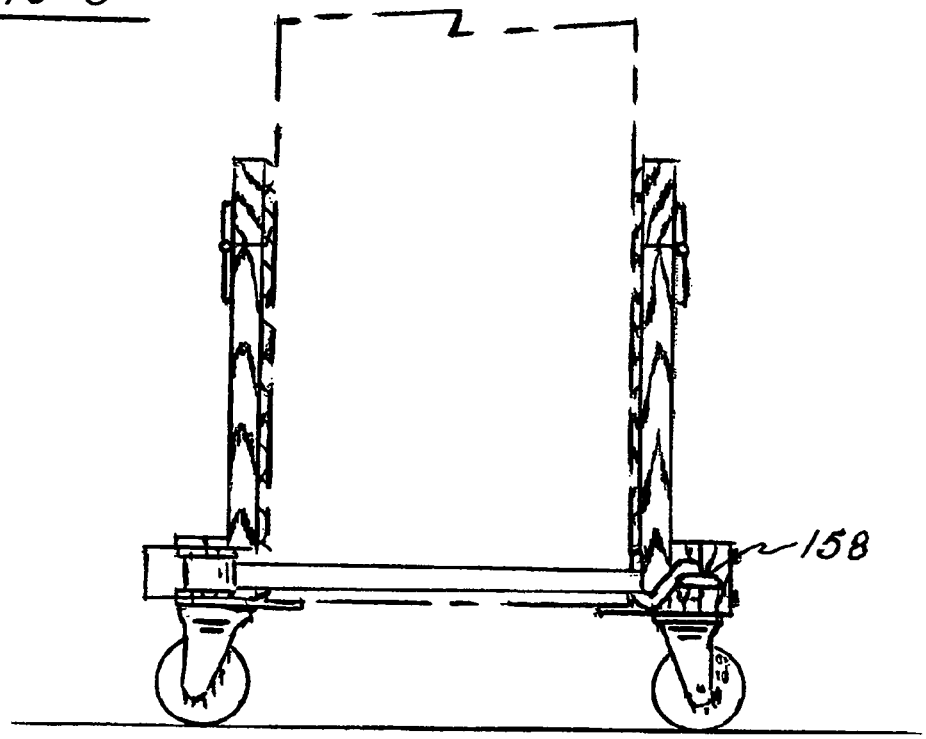
FIG. 6 is a side elevation view of the dolly of FIG. 5 showing the dolly in its full lifting configuration for transporting the object.

Referring to FIGS. 4-7, upon activation of the winch assemblies 145 by operating the conventional pulley and gear systems 148 such that the belts 150 tighten to cause the each first subframe 114 of frames 102 and 104 to pivot inwardly (FIG. 5) to ride along rollers 142 such that angle β between the spaced apart generally vertical legs 106 and the spaced apart generally vertical members 118 decreases as the spaced apart generally vertical legs 106 move into a more vertical orientation such that they are parallel to the spaced apart generally vertical members 118 (FIG. 6) thereby pushing the first upper generally horizontal end rail 108 upwardly to raise upwardly the spaced apart generally vertical members 118 and the a generally horizontal brace 126 thereby lifting the object 12 upwardly off the floor 14 until the dolly 100 is in its full transporting configuration as shown in FIG. 6.

In a preferred embodiment of the invention the longitudinal outboard ends of the outer face 146 of the horizontal cross member 112 each include outwardly extending extension blocks 158 (FIG. 7) for mounting rollers 136 thereto allowing the object 12 to be lifted upwardly higher off the floor 14. It should now be apparent to one skilled in the art that by positioning the rollers 142 more outwardly away from the object 12 will result in increasing the upward movement of the generally horizontal brace 126 as the rollers 142 are moved in the forward direction towards the object 12 into the lifting configuration. It should also be understood that in another preferred embodiment by using larger diameter rollers 142 will also increase the amount of upward movement of the brace 126.

In another preferred embodiment of the invention, as shown in FIG. 4, the outer face 160 of the upper generally horizontal end rail 110 of first frame 102 and/or second frame 104 includes an attachment apparatus 162 for attaching a handle 164. Preferably, the attachment apparatus 162 is a conventional open hinge for permitting the handle 164 to pivot side to side to allow the operator to easily move and maneuver the dolly 100 and the object being transported. It should be understood that other conventional attachment apparatus can be utilized, such as ball joint attachment apparatus that allows the handle to pivot upwardly, downwardly or sideways. It should also be understood that the attachment apparatus 162 also can be such that the handle 164 can be easily removed or permanently attached to the end rail 110. It should also be understood that other methods can be used for moving the dolly while loaded, such as by use of an electric or gas operated motor mechanically coupled to one or more rollers for diving the rollers to move the loaded dolly.

In another preferred embodiment of the invention, the first frame 102 and the second frame 104 each include a limiting device 166 (FIG. 2), such as a cord, rope, cord, chain, or other structure effective to limit the distance that the generally vertical legs 106 can pivot rearwardly from the respective spaced apart generally vertical members 118.

To better illustrate the dolly and its benefits, the operation of the dolly 100 shall be described. Referring to FIG. 4, the dolly 100 is shown in its starting loading configuration whereby the first frame 102 and the second frame 104 and placed in proper position on opposite sides of the object 12 to be lifted and transported to a new location. As shown, the dolly 100 is in its loading configuration whereby the generally horizontal braces 126 are in their lowest position such that they are able to slide under opposite edges 10 of the object 12. It should be understood that in the event the horizontal brace 126 cannot easily slide under an edge 10, the object 12 the first and second frames 102, 104, can be tilted slightly to allow the horizontally extending plate sections 136 of the horizontal braces 126 to be positioned under the edges 10 of the object 12. As shown, in FIGS. 4 and 7, the attachment device 152 of each belt 150 of winches 145 are coupled to the respective attachment element 154 and the conventional pulley and gear system 148 and operated to shorten the length of the belt(s) 150 which pull and pivot the generally vertical legs 106 of both the first frame 102 and the second frame 104 inwardly into the lifting configuration such that they are oriented generally parallel with their respective generally vertical members 118 as shown in FIG. 5, and thereby lifting the generally horizontal brace 126 upwardly into their fully upper position to lift the object 12 off the floor 14. Using the handle 164 the operator can easily move and maneuver the dolly 100 and the lifted object 12 along the floor 14.

It should be understood that the dolly of the subject invention can be constructed from various materials including wood, metal, metal alloy, plastic, plastic composite, fiberglass, epoxy, and carbon-graphite. The particular material can be easily selected by one skilled in the art based on the size and lifting capacity for the specific dolly.

It should now be apparent that the dolly of the subject invention is capable of allowing relatively heavy and bulky objects to easily manipulated and moved. In addition, the dolly is capable of attaching to an object without adding significantly to the dimension of the object thereby allowing the object to be easily moved through conventional door openings. Further, it should be apparent that the dolly is relatively inexpensive to manufacture, easily attached and detached to an object, and is relatively easy to maneuver the object being transported.

Although the foregoing invention has been described in some detail for purposes of clarity of understanding, it should be apparent that certain changes and modifications may be practiced within the scope of the appended claims. Furthermore, it should be noted that there are alternative ways of implementing the method and article for implementing the method of the present invention. Accordingly, the present embodiments and examples are to be considered as illustrative and not restrictive, and the invention is not to be limited to the details given herein, but may be modified within the scope and equivalents of the appended claims.

The invention claimed is:

1. A method for lifting and transporting an object along a surface, the method comprising the steps of:
   placing a first frame along a first side of the object and a second frame along a second opposing side of the object, wherein the first frame and the second frame each have spaced apart members connected together by a brace and a pair of spaced apart legs pivotally attached to the spaced apart members and each spaced apart leg having a roller;
   placing the object into a loading position by moving the first and second frame such that each brace slides under an edge of the object;
   placing the object into a lifting configuration by moving the spaced apart legs such that each roller rolls continuously along the surface towards the object to rotate each pair of spaced apart legs into a more vertical position such that each brace is moved upwardly and the object is moved upwardly by the upward movement by each brace.

2. The method of lifting and transporting an object of claim 1 further comprising the step of using a winch for extending or retracting one or more belts wherein the belts are coupled with the vertical legs such that retracting the belts move the vertical legs into a more vertical orientation.

3. The method of lifting and transporting an object of claim 1 further comprising the step of using a handle attached to the first frame or the second frame to maneuver and transport the object.

4. The method of lifting and transporting an object of claim 1 further comprising the step of longitudinally moving each brace along the spaced apart members.

5. The method of lifting and transporting an object of claim 1 further comprising the step of using a handle attached to the first frame and a handle attached to the second frame to move and maneuver the object.

6. A method for lifting and transporting an object along a surface, the method comprising the steps of:
placing a first frame along a first side of the object and a second frame along a second opposing side of the object, wherein the first frame and the second frame each have spaced apart members connected together by a brace and a pair of spaced apart legs pivotally attached to the spaced apart members and at least one roller attached to the first frame and at least one roller attached to the second frame,
moving the first and second frame such that each brace slides under an edge of the object;
moving the spaced apart legs such that each roller rolls continuously along the surface towards the object to rotate each pair of spaced apart legs into a more vertical position such that the object is moved upwardly by the upward movement by each brace.

7. The method of lifting and transporting an object of claim 6 further comprising the step of using a winch for extending or retracting one or more belts wherein the belts are coupled with the vertical legs such that retracting the belts move the vertical legs into a more vertical orientation.

8. The method of lifting and transporting an object of claim 6 further comprising the step of using a handle attached to the first frame or the second frame to maneuver and transport the object.

9. The method of lifting and transporting an object of claim 6 further comprising the step of longitudinally moving each brace along the spaced apart members.

* * * * *